Feb. 8, 1927.
1,617,272

C. A. PETERSON

EDUCATIONAL APPARATUS

Filed June 30, 1926  2 Sheets-Sheet 1

WITNESSES
William P. Goebel
Chris Feinle

INVENTOR
Charles A. Peterson
BY Munn & Co
ATTORNEYS

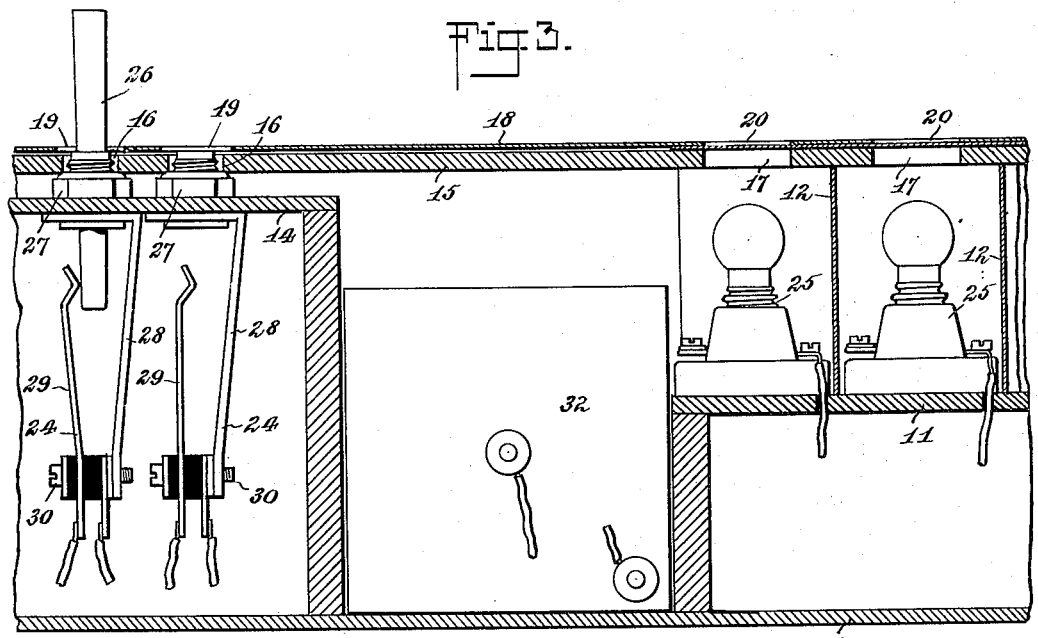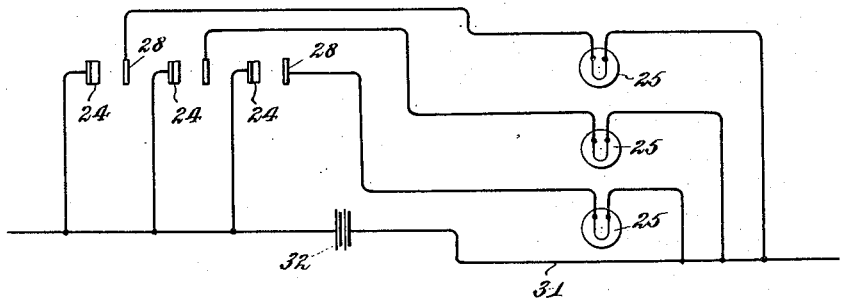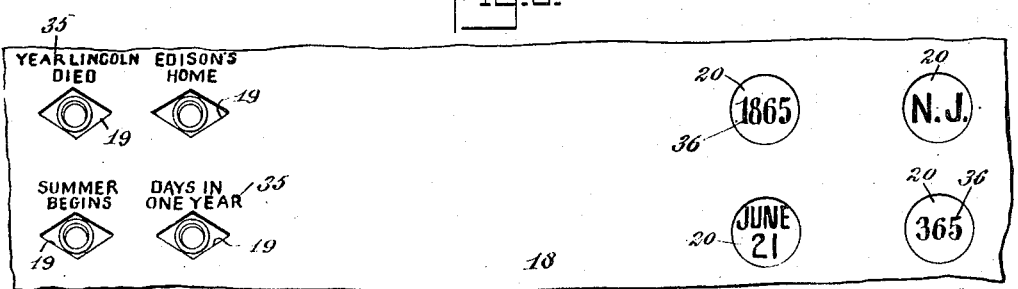

Patented Feb. 8, 1927.

1,617,272

UNITED STATES PATENT OFFICE.

CHARLES AXEL PETERSON, OF ALABASTER, MICHIGAN.

EDUCATIONAL APPARATUS.

Application filed June 30, 1926. Serial No. 119,713.

This invention relates to educational apparatuses.

One of the objects of the present invention is the provision of a self instructing apparatus having attributes by virtue of which a person may become instructed in divers subjects such as arithmetic, history, etc.

Another, and a more specific object of the present invention is the production of an apparatus of the indicated character with which a person may select with a single instrumentality or manipulator a certain problem or question by manipulating with said instrumentality or manipulator a particular device associated with the problem or question, which device, in turn actuates a visually indicative means associated with the correct answer to the problem or question aforesaid.

With the foregoing, other objects of the invention will appear from the embodiment of the invention, which, by way of example is described in the following specification and illustrated in the accompanying drawings, in which—

Fig. 3 is a sectional view taken substantially on the line 3—3 of Fig. 2.

Fig. 4 is a diagrammatic view illustrating some of the switch and lamp circuits.

Fig. 5 is an elevation of a portion of a modified form of guide chart or plate.

Figure 1:
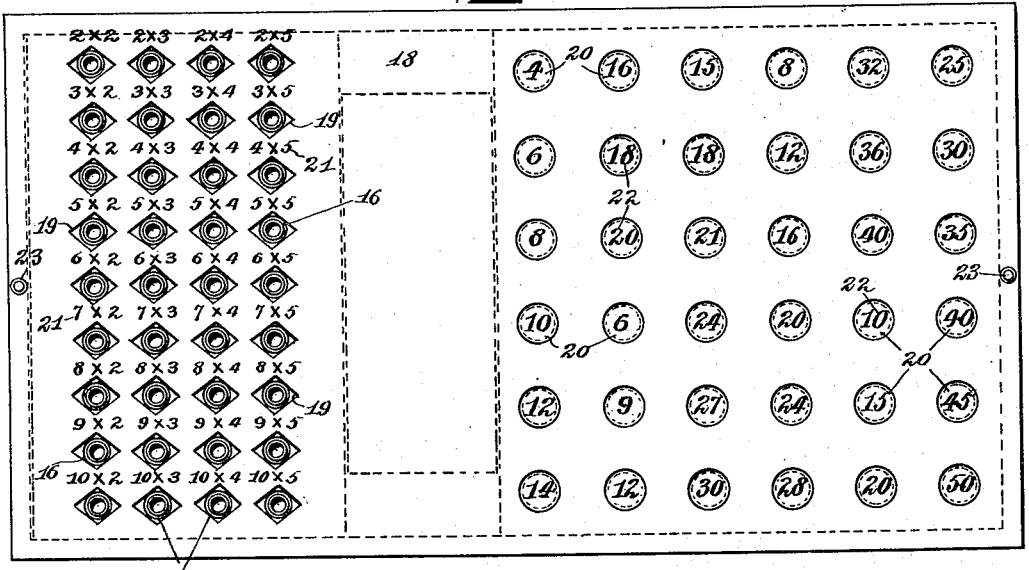
Figure 1 is a plan view of the apparatus.
Figure 2:
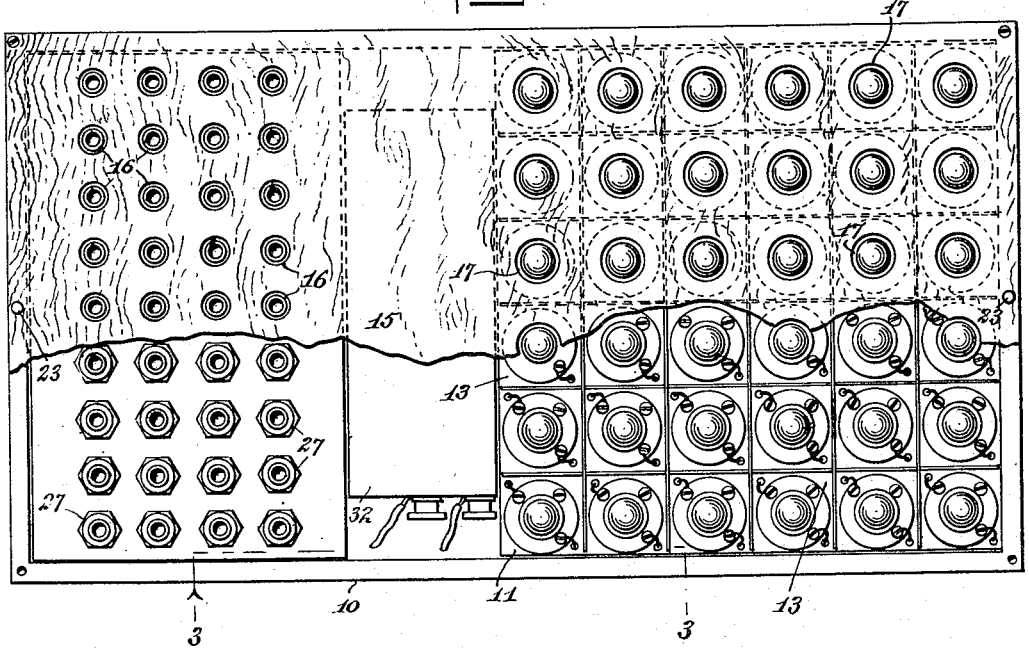
Fig. 2 is a plan view with the guide chart or plate removed and its support broken away to show certain features of the invention.

Referring now more particularly to the several views of the drawing, it will be apparent that, in the illustrated embodiment of the invention, there is shown a supporting structure 10 in the form of a casing or housing which includes a bottom, side walls, and end walls. The structure 10 also includes a support 11 on which are arranged series of longitudinal and transverse partitions 12 which provide a series of compartments 13. The structure 10 also includes a support 14. Secured in any suitable manner to the walls of the structure 10 is a support 15 which has a series of holes 16 therein, and a series of holes 17 therein equal in number to the number of holes 16.

In order to provide a series of problems or questions, and correct answers to such problems or questions on any preferred subject such as arithmetic, history or any others, there are provided a plate or the like 18 having a series of holes 19 therein equal in number and arrangement to the number and arrangement of holes 16 in the support 15, and a series of transparent panels or members 20 equal in number and arrangement to the number and arrangement of the holes 17 in the support 15. As shown in Fig. 1 the plate 18 has associated with each of the holes 19 intelligence matter 21 formulating an example or problem in arithmetic, whereas, each of the transparent panels or members 20 has associated therewith, in the present instance, inscribed thereon intelligence matter 22 formulating a correct answer to one of the formulated examples or problems aforesaid. The plate 18 is adapted to rest on the support 15 and any suitable means such as the pins 23 carried by the end walls of the structure 10 may be provided for maintaining the plate 18 in place with the holes 19 and transparent panels 20 respectively in registration with the holes 16 and 17 in the support 15. The pins 23 are adapted to enter the holes respectively in the opposite ends of the plate 18, so that the plate 18 may be removed at will for the application of other similar plates 18 with divers other intelligence matter.

In accordance with another feature of the present invention, actuating devices 24 are associated respectively with the formulated problems or questions 21, and visually indicative devices 25 are respectively associated with the formulated answers 22 aforesaid. Each device 24 is operatively connected to one of the devices 25 so that upon manipulation of a particular device 24 a corresponding device 25 will be actuated. A manipulator 26 is provided for actuating each of the devices 24. The devices 24 in the present instance are in the form of jack switches and are supported by the support 14. These jack switches are equal in number to the number of holes 16 and 19 of the support 15 and plate 18 respectively, and are arranged in a similar manner. Each jack switch consists of a socket member 27 arranged in an opening in the support 14, a member 28 electrically connected to the socket member 27, and a flexible contact 29 electrically connected to the member 28 by a binding screw 30, as shown most clearly in Fig. 3. The devices 25 are arranged respectively in the compartments 13, and each is in the form of an electric lamp secured to the support 11. The number of lamps is equal to the number of holes 17 in, and transparent panels 20 of, the support 15 and plate 18 respectively. The jack switches and electric lamps are connected in parallel in an electric circuit 31 including a source of electrical energy 32, there being one jack switch in series with one lamp.

When it is desired to use the apparatus, the desired guide or plate 18 is arranged on the support 15. As shown in Fig. 1, the plate 18 is in place and serves as an example. The said plate has the intelligence matter aforesaid which formulates problems and corresponding answers in arithmetic. When the manipulator 26, which is of conducting material, is inserted in one of the socket members 27 of a particular device 24 through registering holes 19 and 16 respectively in the plate 18 and support 15, electrical connection will be established between the contact 29 and the socket member 27, which is in the form of a contact, and as a result a circuit will be closed through its related lamp 25 to light the same. The particular lamp being lighted will illuminate the transparent panel 20 immediately above the same to direct attention to the particular formulated answer 22 associated with the transparent panel. It will be obvious that if the manipulator 26 is inserted in the device 24 associated with the problem "2x2" that the transparent panel having the number "4" printed thereon will be illuminated to thus indicate to a person that "4" is the correct answer to the problem "2x2".

There is shown in Fig. 5, in lieu of the intelligence matter 21 and 22 matter 35 formulating historical questions, and matter 36 formulating answers respectively to the questions formulated.

From the foregoing it will be apparent that the apparatus of the present invention is one suitable for use by school children for self-instruction in certain rudiments of arithmetic or for instructions in history and any other subject by the use of a manipulator 26 which serves as an indicator on the one hand of the particular problem or question to be answered, while the lamps 25 serve to visually indicate the particular answer to the selected problem or question indicated by the manipulator 26.

I claim:

1. An educational apparatus comprising a series of actuating devices, intelligence matter formulating a question associated with each of said devices, transparent members, intelligence matter on each of said transparent members formulating an answer to one of the formulated questions aforesaid, illuminating means associated with each transparent member and capable of illuminating the same, means operatively connecting said devices with said illuminating means, and a single means for actuating each of said actuating devices to actuate said illuminating means to illuminate one of said transparent members.

2. An educational apparatus comprising a plate having a series of holes therein and a series of transparent members equal in number to the number of holes, printed matter at each hole formulating a problem, printed matter at each of the transparent members formulating a correct answer to one of the formulated problems aforesaid, an electric circuit comprising a source of electrical energy, jack switches and electric lamps, the jack switches being equal in number and arrangement to the number and arrangement of holes in said plate, and the lamps being equal in number and arrangement to the number and arrangement of said transparent members of said plate, means for supporting said plate, the plate when supported having the holes thereof in registration with said jack switches and the said transparent members thereof in registration with said lamps, and means selectively insertable in said holes to coact with said jack switches to close the circuit to light the lamps, as and for the purpose specified.

3. In an educational apparatus, a plate having a series of holes therein, an arithmetical problem associated with each of said holes, transparent members equal in number to the number of holes, said transparent members carried by said plate, an arithmetical answer to one of the arithmetical problems aforesaid associated with each of said transparent members, and in combination, a manipulator, means operable by said manipulator when inserted through one of said holes, and means actuated by the first mentioned means upon the operation of the latter which illuminates one of said transparent members, as and for the purpose specified.

CHARLES AXEL PETERSON.